(12) United States Patent
Willis

(10) Patent No.: US 10,121,308 B2
(45) Date of Patent: Nov. 6, 2018

(54) CARD DISPENSER

(71) Applicant: ASAHI SEIKO CO., LTD., Minato-ku, Tokyo (JP)

(72) Inventor: Marcus Willis, Sittingbourne (GB)

(73) Assignee: ASAHI SEIKO CO., LTD., Tokyo (JP)

( * ) Notice: Subject to any disclaimer, the term of this patent is extended or adjusted under 35 U.S.C. 154(b) by 0 days.

(21) Appl. No.: 15/684,637

(22) Filed: Aug. 23, 2017

(65) Prior Publication Data

US 2018/0082512 A1     Mar. 22, 2018

(30) Foreign Application Priority Data

Sep. 19, 2016    (GB) .................................. 1615879.2

(51) Int. Cl.

| | |
|---|---|
| *G07F 17/00* | (2006.01) |
| *G06K 7/10* | (2006.01) |
| *G07F 19/00* | (2006.01) |
| *G06Q 20/34* | (2012.01) |

(Continued)

(52) U.S. Cl.
CPC ..... *G07F 17/0014* (2013.01); *G06K 7/10366* (2013.01); *G06Q 20/355* (2013.01); *G07F 7/125* (2013.01); *G07F 11/045* (2013.01); *G07F 19/21* (2013.01)

(58) Field of Classification Search
None
See application file for complete search history.

(56) References Cited

U.S. PATENT DOCUMENTS

| | | | |
|---|---|---|---|
| 4,620,634 A | 11/1986 | Takiguchi | |
| 6,056,150 A * | 5/2000 | Kasper ..................... | B65H 1/06 209/657 |

FOREIGN PATENT DOCUMENTS

| | | |
|---|---|---|
| EP | 0 602 775 | 9/1993 |
| JP | 10-171930 | 6/1998 |
| JP | 2012-238127 | 12/2012 |

(Continued)

OTHER PUBLICATIONS

European Search Report, EP 17 18 7457, European Patent Office, dated Oct. 10 2017, 2 pages.

(Continued)

*Primary Examiner* — Kristy A Haupt

(57) ABSTRACT

A card dispenser is provided comprising a capture chamber configured to receive a card dispensed from a read position by a card feed mechanism, the capture chamber comprising walls defining an exit aperture for dispensing a card to a user. A capture flap is moveable from a first orientation to a second orientation, wherein in the first orientation the capture flap is arranged to block the exit aperture so as to prevent a card from passing through said exit aperture, and in the second orientation the capture flap is arranged to guide a card through said exit aperture. If a first output is received from a communication module, the capture flap is held at the first orientation such that a card dispensed from a read position moves under the influence of gravity through the capture chamber into a card bin. If a second output is received, the capture flap is moved from the first orientation to the second orientation such that a card dispensed from the read position slides along the capture flap under the influence of gravity through the exit aperture.

16 Claims, 9 Drawing Sheets

(51) Int. Cl.
*G07F 7/12* (2006.01)
*G07F 11/04* (2006.01)

(56) References Cited

FOREIGN PATENT DOCUMENTS

| WO | WO 03/071472 | 8/2003 |
|---|---|---|
| WO | WO 2016/051131 | 4/2016 |

OTHER PUBLICATIONS

Great Britain Search Report, GB1615879.2, United Kingdom Intellectual Property Office, dated Jan. 30, 2017, 3 pages.

\* cited by examiner

CARD DISPENSER

The present invention relates to card dispensers. An example application of the invention is to provide a means for controlling the movement of cards issued from a card cassette within a card dispenser, to allow for communication with the card to occur and to provide a subsequent means of physical control.

Card dispensers are often incorporated into ticket vending or issuing machines provided at parking lots, public transport stations, laundrettes and shops. These vending machines issue cards containing secure elements (such as chips or magnetic strips) onto which data is encrypted in accordance with selections made by a user purchasing the card from the vending machine. Typical cards issued by these machines include contact cards and contactless cards (also referred to as smart cards) including for example prepaid, credit, debit, charge and pay-as-you-go payment cards.

An example of a prior art card dispenser 10' is provided in WO 2016/051131 A1 and illustrated in FIG. 1. A card is dispensed through an entrance aperture 2' onto a floor member 5' which is arranged at a first orientation of 45 degrees with respect to the horizontal. The floor member 5' is connected to a housing of the dispenser by a pivot provided adjacent to the entrance aperture 2'. The card slides along the floor member 5' under the influence of gravity until it abuts against a gate 11'. A solenoid is provided for opening and closing the gate 11' so as to allow or prevent the card from moving through an exit aperture 6'.

A communication module 3' is provided for contactless communication with the card resting against the floor member 5'. The communication module 3' will encode data onto the card and subsequently read that data from the card to verify that it was correctly encoded. If the communication module 3' determines that the data is correct, a signal will be issued by a controller 4' causing the solenoid to open the gate 11'. The card will subsequently slide through the exit aperture 6' and onto a collection tray, where it may be retrieved by a user. If the communication module 3' determines that the data encrypted onto a card has been corrupted, the gate 11' will remain closed an actuator 7' will be energised causing the floor member 5' to move about the pivot to a second orientation. The second orientation is typically vertical such that the card falls and is captured internally within a bin provided beneath the floor member 5' where it cannot be retrieved by a user.

A problem occurs if the gate 11' becomes jammed in an open configuration because a card may be dispensed to a user before the data has been encoded and verified. A user may not recognise that the card is blank, or contains corrupted data, and may proceed to attempt to use it, leading to confusion. There is therefore a need for a more reliable card dispenser in which this problem does not occur.

In accordance with a first aspect of the invention, there is provided a card dispenser comprising:
- a card store configured to hold a stack of cards;
- a card feed mechanism configured to feed a card from the card store to a read position and to dispense said card from the read position;
- a communication module arranged to communicate with a card provided at the read position;
- a capture chamber configured to receive a card dispensed from the read position by the card feed mechanism, the capture chamber comprising walls defining an exit aperture for receiving a card dispensed to a user;
- a capture flap provided within the capture chamber, wherein said capture flap is moveable from a first orientation to a second orientation, wherein in the first orientation the capture flap is arranged to block the exit aperture so as to prevent a card from passing through said exit aperture, and in the second orientation the capture flap is arranged to guide a card through said exit aperture;
- a card bin configured to receive a card from the capture chamber when the capture flap is arranged at the first orientation; and
- a control system for controlling movement of the capture flap in accordance with an output received from the communication module such that:
  if a first output is received, the capture flap is held at the first orientation such that a card dispensed from the read position moves under the influence of gravity through the capture chamber into the card bin, and if a second output is received, the capture flap is moved from the first orientation to the second orientation such that a card dispensed from the read position slides along the capture flap under the influence of gravity through the exit aperture.

A card dispenser is therefore provided in which a card is only dispensed onto a capture flap if a second output is received from the communication module. If the second output is not received, or if a first output is received, the capture flap is held at the first orientation. Once dispensed from the read position, the card will only be delivered to a user if the capture flap is arranged at the second orientation, where it unblocks the exit aperture. Therefore if the control system should fail, for example due to a mechanical error, a card will not be erroneously dispensed to the user. A failsafe mechanism is hence provided which increases the reliability of the card dispenser.

At the first orientation the capture flap is arranged to prevent a card from passing through the exit aperture. This movement of the card could be in either direction (i.e. into or out of the capture chamber). Optionally the exit aperture itself may be accessible to a user. A further benefit is therefore provided in that the capture flap prevents the card dispenser from being tampered with by a user inserting cards or other items through the exit aperture when the capture flap is arranged at the first orientation. The capture flap therefore performs two functions, which can mean that other parts, such as gates, which are commonly provided in prior art card dispensers are no longer required. This improves the simplicity of the device, reduces manufacturing costs and further reduces the likelihood of a mechanical error occurring. The capture flap preferably fully closes the exit aperture when the capture flap is arranged at the first orientation. Movement of the capture flap from the first orientation to the second orientation may in effect form the exit aperture therefore. This provides an additional level of security.

Preferably, at the first orientation the capture flap provides a path from the read position to the card bin and closes the exit aperture, wherein movement of the capture flap from the first orientation to the second orientation opens the exit aperture and closes said path to the card bin.

Advantageously said capture flap may comprise a first surface and a second surface, wherein the second surface is provided opposite to the first surface; wherein in the first orientation, the second surface blocks movement of a card from the capture chamber through the exit aperture, and in the second orientation, the capture flap is arranged such that a card may slide along the first surface through the exit aperture. The card will typically only be able to slide along the capture flap when the capture flap is orientated at the second orientation. Depending on the arrangement however it may be possible for a portion of the card to skim or slide along the second surface when the capture flap is arranged at the first orientation. Most typically however the capture flap is arranged at the first orientation such that a front edge of a card which is dispensed from the read position will strike the second surface, causing the card to be deflected into the card bin. Alternatively, depending on the speed at which the card is dispensed from the read position, the card may fail to strike the second surface and simply fall through the capture chamber into the card bin under the influence of gravity. Conversely, an entire surface of the card will typically come into contact with the first surface of the capture flap, during movement of the card, when the capture flap is arranged at the second orientation and the card is dispensed from the read position.

The capture flap preferably comprises a floor member along which the card may slide when the capture flap is orientated at the second orientation. The first and second surfaces are preferably provided on opposing surfaces of the floor member, which may be two-sided. The floor member preferably makes a first non-zero angle with the horizontal when the capture flap is at the first orientation, wherein said first angle is preferably between 60 and 120 degrees, more preferably between 70 and 110 degrees, preferably still between 80 and 100 degrees. The floor member preferably makes a second non-zero angle with the horizontal when the capture flap is at the second orientation, wherein said second angle is smaller than the first angle and is preferably between 30 and 60 degrees, more preferably between 40 and 50 degrees.

Preferably, the floor member comprises castellated features protruding from a lowermost end of the floor member, and the capture chamber further comprises blocking members, wherein the blocking members are configured to engage with the castellated features in an interleaved manner, wherein the blocking members are arranged to extend along the same plane as the floor member when the capture flap is positioned at the second orientation. The blocking members and the castellated features may hence interact so as to enable uninterrupted gliding of the card towards the exit aperture when the capture flap is at the second orientation, and to further prevent device tampering.

The capture flap is preferably moveable between the first and second orientations about a pivot provided adjacent to the exit aperture. For example the pivot may be provided at the lowermost end of the capture flap (i.e. the end closest to the exit aperture). This arrangement enables simple control of the movement of the capture flap between the first and second orientations at the preferred angles.

It is possible that the electrical power to the card dispenser could be terminated either inadvertently during use of the dispenser, or intentionally for example during transportation of the dispenser. It is desirable for the capture flap to remain in the first orientation if this occurs. The capture flap is therefore preferably biased towards the first orientation. This biasing force is typically provided by a mechanical member, such as a spring member.

The dispenser may further comprise a flap drive configured to move the capture flap between the first and second orientations, wherein said flap drive is controlled by the control system. The flap drive may comprise a motor or a solenoid, and optionally the spring member and/or pivot previously discussed.

The control system is preferably configured to control the card feed mechanism so as to dispense a card from the read position if the first or second output is received from the communication module. Unlike the capture flap, the movement of the card feed mechanism may therefore be independent of whether the communication module provides the first output or the second output.

It is desirable to produce a compact and reliable card dispenser having a minimal number of moving parts, such as belts or pulleys, which could potentially fail. The card feed mechanism is therefore preferably configured to move a card in a first direction from the card store to the read position, and to dispense a card from the read position by further movement of the card in the first direction. The same mechanical member(s) of the card feed mechanism (e.g. a motor) may therefore be used to control the movement of the card from the card store to the read position, and to dispense the card into the capture chamber from the read position.

Card dispensers are typically integrated within vending machines. It is desirable to reduce the overall size of the card dispenser, which is typically longest along the primary direction of travel of the card (in this case the first direction). Even minor reductions in size can be useful as they may allow for the overall size of the vending machine to be reduced, thereby allowing it to be integrated into smaller spaces. A reduction in the size of the dispenser may also allow additional space for alternative features to be included within the vending machine. The card feed mechanism is preferably configured to feed a substantially rectangular card having two opposing short edges and two opposing long edges. In order to achieve a reduction in the overall length of the card dispenser in the first direction, the card feed mechanism may be configured such that the short edges of the card are arranged parallel to the first direction when the card is fed from the card store to the read position.

The communication module is preferably adapted to communicate with the card, so as to read and/or write data onto the card. The communication module may communicate with the card either through known contact or contactless communication techniques. In order to do this, the communication module may comprise any of a transmitter, a receiver, contact terminals and signal processing equipment including processors and memory.

The communication module is preferably adapted for contactless communication with a card provided at the read position. An additional benefit of the device becomes apparent in this instance since, unlike contact cards, it is not necessary to ensure that an accurate physical contact or alignment is achieved between a terminal of a communication module and the secure element of the card. Furthermore, the card does not need to be traversed back and forth through the communication module in order to read from, or write data to, the card. Contactless communication may instead occur between the card and the communication module within a range of positions, including the read position, and potentially during movement of the card. This further reduces the horizontal length of the card dispenser and creates greater design freedom. Once issued, the card may be read or encoded at a later date by a separate contactless communication module provided outside of the device, without the need to be reinserted into the card dispenser. In the event that the device is intended for use with contact cards, an appropriate communication module configured for contact communication with a card may be provided, including a connector configured to connect with a chip or magnetic strip provided on said card.

A pre-encoded or blank card containing data or no data as applicable may be initially stored within the card store. The communication module is configured to encode data onto a card provided at the read position, for example in response to a purchase made by a user of a vending machine into which the card dispenser is incorporated. The communication module may be further configured to read data encoded onto a card provided at the read position, for example to verify that it has been correctly written to the card.

The first output may indicate that data stored on the card has not been correctly encoded to the card. The second output may indicate that data stored on the card has been correctly encoded onto the card. For instance, having encoded data onto a secure element provided on the card and having then subsequently read this data, the communication module may compare the monitored card data against source data (which was supposed to be written onto the card) and determine that an error had occurred in the encoding process leading to the data being corrupted. In this instance, the capture flap is held at the first orientation and the card feed mechanism activated so that the card is dispatched to the card bin, which is not generally accessible to a device user.

By use of the control system, the dispenser may dispatch the card to either the card bin or the exit aperture. The card bin may be thought of as an internal storage compartment and is preferably arranged so as to not be accessible by a user during operation of the card dispenser. The card bin may comprise a bin aperture for receiving cards travelling from the capture chamber into the card bin. The dispenser may further comprise a collection tray arranged to receive a card from the exit aperture. The collection tray may typically be accessible to a device user during normal use of the card dispenser.

The stack of cards typically comprises a plurality of vertically aligned cards and the card store is preferably a cassette, which may be removable or non-removable from the dispenser. The card feed mechanism is preferably configured to move an end card of the stack. The cassette is preferably vertically arranged within the dispenser, in which case the end card is preferably the lowermost card. Where this is the case the cards in the cassette may naturally be moved towards the card feed mechanism by gravity. Alternatively however the cassettes may be stacked in the opposite direction with a spring being used to move the uppermost card (which is now the end card) to the card feed mechanism.

Embodiments of the invention will now be described with reference to the accompanying drawings, in which.

Figure 1:
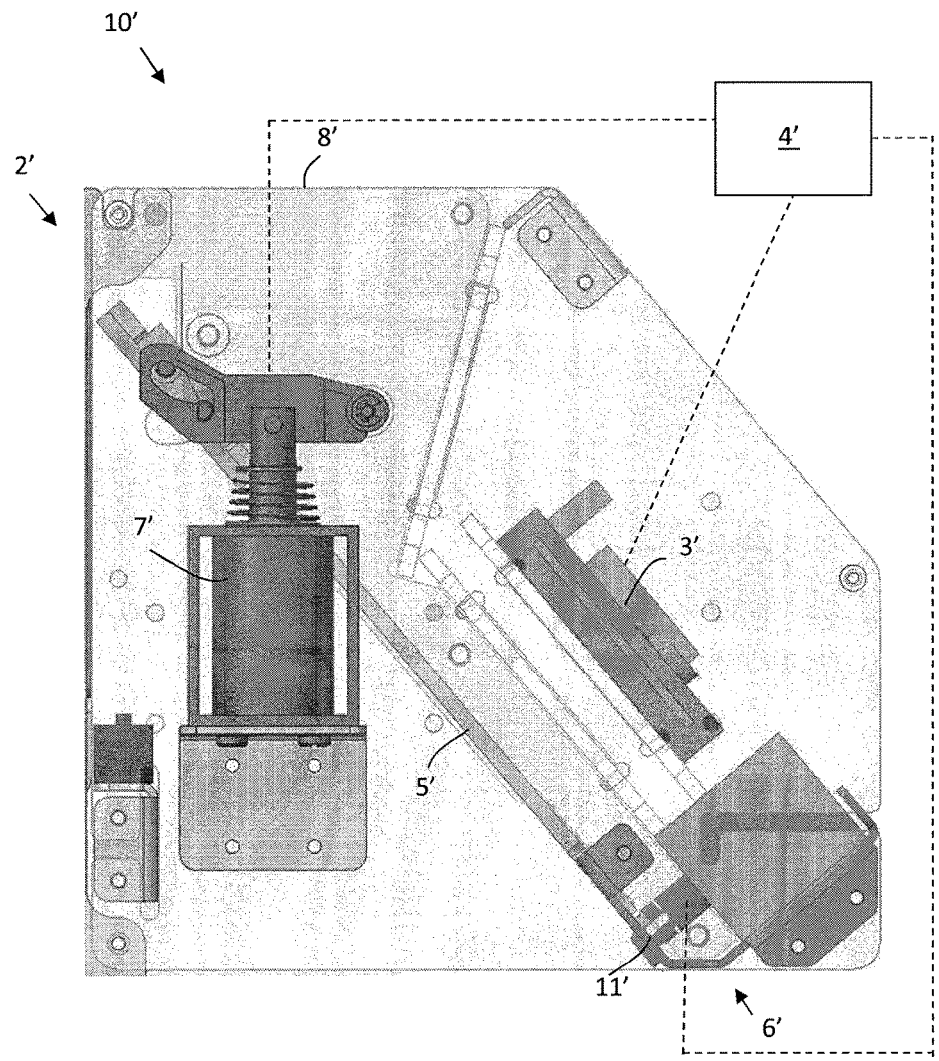
FIG. 1 is a schematic cross-sectional illustration of a prior art card dispenser.
Figure 2:
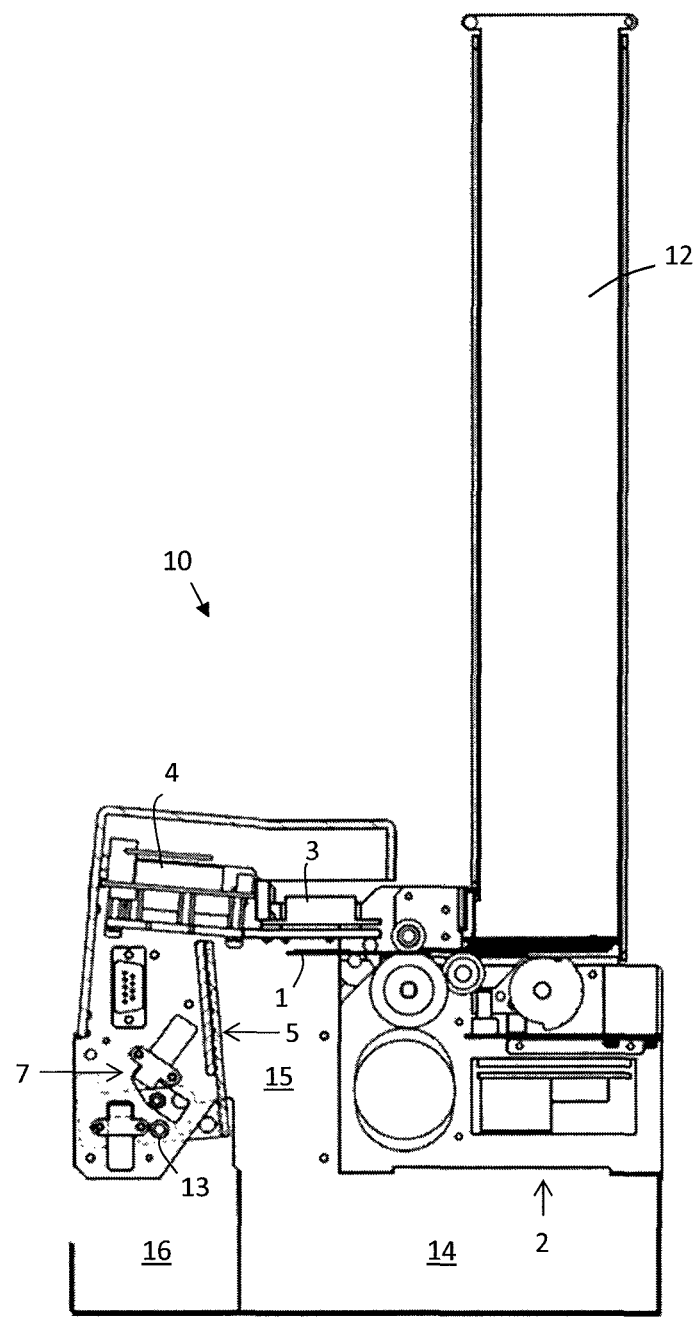
FIGS. 2-6 are schematic cross-sectional illustrations of a first embodiment of a card dispenser.

A cross-sectional view of a card dispenser 10 according to a first embodiment of the invention is shown by FIG. 2. The same card dispenser is shown by FIGS. 3-6 however certain features have not been shown for clarity purposes.

The card dispenser 10 comprises a card store 12 in the form of a cassette, which is configured to hold a vertically aligned stack of cards. In the embodiment shown the cassette 12 is integrated to the card dispenser 10 such that cards may be individually added to the card store during maintenance. In alternative embodiments the cassette 12 may be removable such that a stack of cards may be fitted to or removed from the card dispenser 10 together.

The cards within the stack are planar and substantially rectangular having two opposing long edges and two opposing short edges (these "edges" may also be thought of as "sides" of the card). The cards are substantially rectangular in that they may be entirely rectangular or may have rounded corners. The cards typically they conform to the ISO/IEC 7810 ID-1 standard size of 85.60 mm×53.98 mm with rounded corners having a radius of 2.88-3.48 mm. This is the same size as standard payment cards, such as debit and credit cards. The cards are adapted for contactless communication with a communication module 3 and comprise a secure element for storing data. Alternatively (or additionally) the communication module 3 may comprise a barcode reader for reading a linear barcode or two-dimensional barcode, for example, located on the card 1.

A mechanical card feed mechanism 2 is provided directly beneath the cassette 12. The card feed mechanism 2 comprises a system of belts and rollers driven by one or more motors. The card feed mechanism 2 is configured to move the lowermost card from the cassette 12 in a first direction, which is a horizontal direction (leftwards in FIG. 2), to a read position. The cassette 12 and the card feed mechanism 2 are arranged such that the short edge of the card is aligned in the first direction during this movement of the card 1. The card feed mechanism comprises a guide of a suitable width to receive and guide a card 1 having the dimensions and orientation discussed above. This arrangement allows for the overall width of the dispenser 10 to be reduced in the first direction when compared to conventional card dispensers in which a similar sized card would be moved through the dispenser with the long edge being aligned in the direction of travel.

FIG. 2 shows a card 1 which is held at the read position by the card feed mechanism 2. One or more sensors may be provided to detect when the card 1 is provided at the read position. Examples of suitable sensors include mechanical sensors such as depressible levers or depressible pins, and light sensors such as through beam or reflective photo-electric sensors/light gates.

A communication module 3 is provided for contactless communication with a card 1 provided at the read position. The communication module 3 comprises suitable known means for encoding and reading data to or from the card using contactless technology, including an antenna, one or more processors and memory. The dispenser 10 may alternatively be configured for use with an IC contact card, in which case the communication module 3 may comprise a landing type connector which is drawn onto the chip of an IC contact card once it has reached the read position.

A capture chamber 15 is provided beneath the communication module 3. The capture chamber 15 defines a largely empty region in which a card dispensed from the read position can free-fall under gravity. A capture flap 5 is configured to be moved within the capture chamber 15 between a first orientation and a second orientation. A storage compartment 14 in the form of a card bin is provided beneath the capture chamber 15 so as to receive a card falling under gravity through the capture chamber 15 when the capture flap 5 is arranged at the first orientation. The card bin 14 is arranged so as to only be accessible by a user during maintenance of the card dispenser 10, during which any cards collected within the card bin 14 may be manually removed. The card bin 14 may be separated from the capture chamber 15 by a bin aperture. This bin aperture, for example, formed within a base of the capture chamber 15. Alternatively, the bin aperture may be considered more broadly as the opening between the capture flap 5 and an opposing surface of the capture chamber 15 when the capture flap 5 is at the first orientation.

A collection tray 16 is arranged beneath the capture chamber 15 and laterally displaced from the card bin 14 so as to receive a card from the capture chamber 15 when the capture flap 5 is arranged at the second orientation. The collection tray 16 is provided to collect any data verified cards from the dispenser 10 and is arranged to be accessible to a device user during normal use of the card dispenser 10.

The card dispenser 10 comprises a housing (which may be closed) wherein an exit aperture 6, formed within the walls of said housing, is opened by movement of the capture flap 5 from the first orientation to the second orientation. Said movement allows a card 1 to be dispensed onto the collection tray 16. The exit aperture 6 may hence be considered the opening between the capture flap 5 and an internal wall of the capture chamber 15 (e.g. stopping member 11) when the capture flap 5 is in the second orientation. The capture flap 5 advantageously closes the capture chamber 15 when orientated at the first orientation so as to obscure any opening from outside of the dispenser 10 into the capture chamber 15. This prevents tampering of the device from occurring by a user inserting items through the exit aperture 6.

The capture flap 5 comprises a planar floor member having first and second opposing surfaces 8, 9. In this example the floor member is made of a common plastic, such as acrylic, which may be ribbed to reduce surface contact and may be coated in a low friction substance, such as PTFE, so as to allow the card to slide freely. Alternatively the floor member 5 may consist wholly or partly of a set of one or more rollers manufactured, for example, from Delrin® to aid sliding.

The capture flap 5 is mounted to the dispenser 10 by a pivot 13 which is provided adjacent to the exit aperture 6 and at the lowermost end of the capture flap 5. The capture flap 5 may be thought of as a "diverter" and is movable between the first and second orientations about the pivot 13 by a flap drive 7 in the form of a solenoid (also known as a "diverter solenoid"). In other embodiments the flap drive 7 may take the form of a motor. The solenoid 7 is spring biased so as to hold the capture flap 5 at the first orientation (or return it to the first orientation) in the event of an electrical power failure to or within the card dispenser 10. Electrical power is preferably supplied to the control system 2 from a kiosk or ticket vending machine into which the card dispenser 10 is incorporated. An Uninterruptible Power Supply (UPS) back-up may be provided to ensure that a transaction can complete in the event of a power loss.

When the capture flap 5 is arranged at the first orientation, the floor member abuts onto the stopping member 11 and makes a first non-zero angle with the horizontal (typically sea or ground level) which is approximately 90 degrees. When the capture flap 5 is arranged at its second orientation, the floor member makes a second non-zero angle with respect to the horizontal of approximately 45 degrees.

The card feed mechanism 2, sensors, communication module 3 and solenoid 7 are controlled by a control system 4 in the form of an electrical controller, such as a Host Controller. The control system 4 may comprise logic, one or more processors and memory (including volatile and non-volatile memory). The control system 4 may issue commands to the card feed mechanism 2, sensors, communication module 3 and solenoid 7 so as to receive responses from these components and initiate each of the steps described in the exemplary method below.

Figure 7:
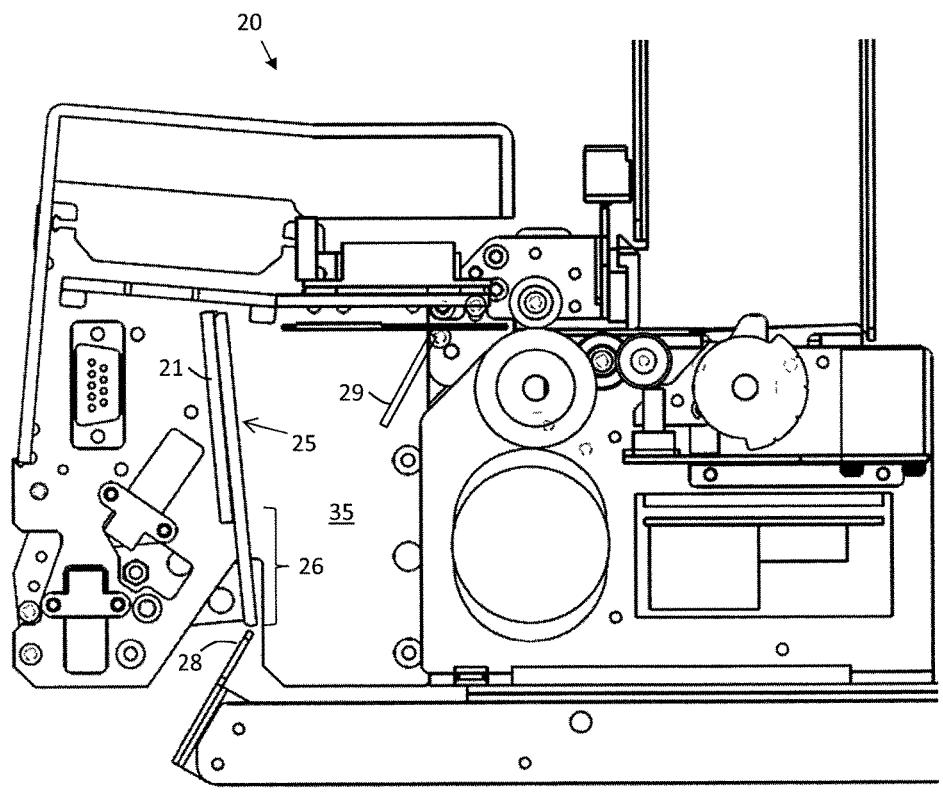
FIG. 7 is a schematic cross-sectional illustration of a second embodiment of a card dispenser.

A second embodiment of a card dispenser 20 is shown by FIG. 7. This embodiment substantially matches the first embodiment however certain features have not been shown for clarity. In the second embodiment, the exit aperture 26 is shown as extending between a stopping member 21 and a guard 28, which form part of the walls of the capture chamber 35. The capture flap 25 is shown in its first orientation in FIG. 7 whereby it is engaged with the stopping member 21 so as to block the exit aperture 26. Also shown, is a guiding element 29 configured to passively guide the card under the influence of gravity towards the centre of the capture chamber 35. Advantageously, the capture flap 25 contacts the guiding element 29 at the second orientation so as to block the bin aperture and prevent a card from falling from the read position into the card bin 14.

Figure 8:
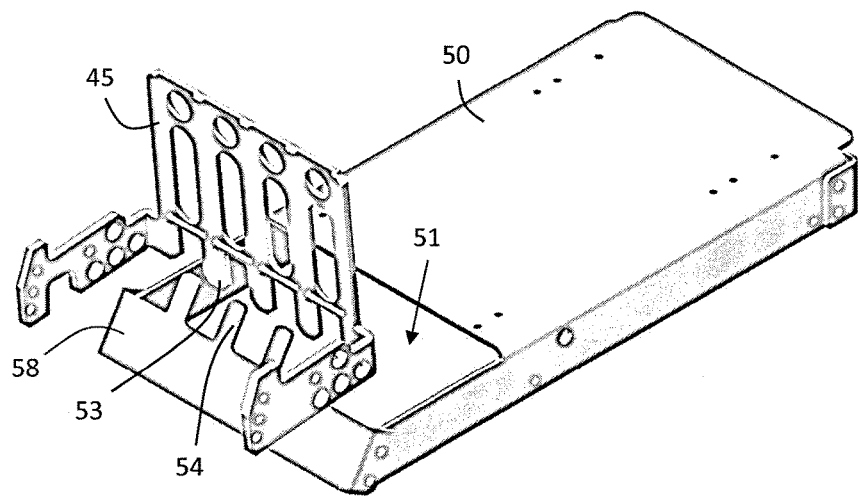
FIG. 8 is an illustration of a capture flap in the first orientation in accordance with a third embodiment.
Figure 9:
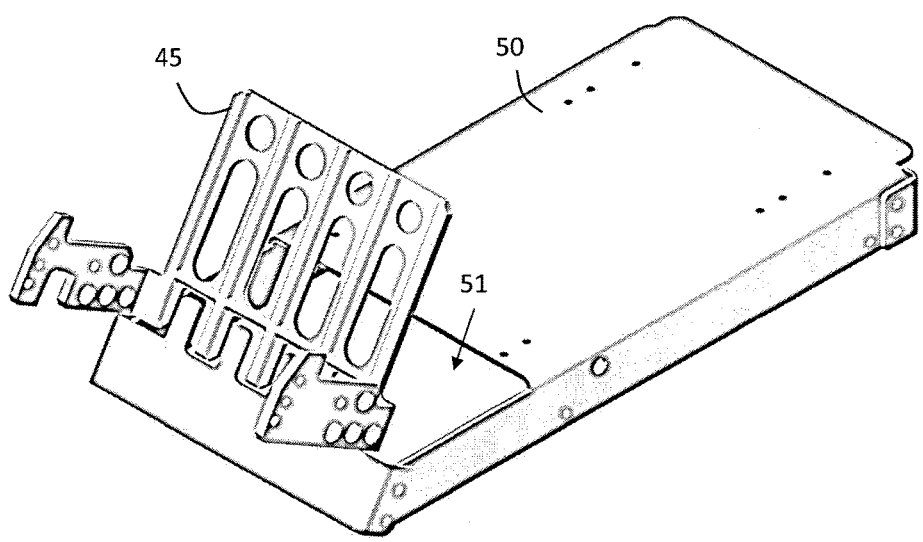
FIG. 9 is an illustration of a capture flap in the second orientation in accordance with a fourth embodiment.

FIGS. 8 and 9 show a capture flap 45 in accordance with a third embodiment. The capture flap 45 may be used in combination with any of the other features within the dispenser previous discussed. In the third embodiment, a plurality of castellated features 53 protrudes from the lowermost end of the capture flap 45. These castellated features 53 engage with blocking members 54 in an interleaved manner. The blocking members 54 are fixed and protrude from a guard 58 that forms part of a support plate 50 located at the base of the capture chamber. The support plate 50 further comprises a bin aperture 51 for receiving rejected cards dispensed to the card bin. The bin aperture 51 may be of variable size and width, as will be appreciated.

The first surface of the floor member of the capture flap 45 is visible in FIGS. 8 and 9. FIG. 8 depicts the capture flap 45 in the first orientation wherein the castellated features 53 extend substantially vertically and the blocking members 54 extend approximately 45 degrees from the vertical. Advantageously, the castellated features 53 and blocking members 54 partially overlap in this orientation so as to prevent a card from being inserted between the capture flap 45 and the blocking members 54, e.g. during attempted tampering Advantageously still, the interleaved arrangement enables movement of the capture flap 45 towards the second orientation, which is shown in FIG. 9. In this arrangement the castellated features 53 and blocking members 54 overlap and extend along the same plane and cooperate so as to enable uninterrupted gliding of the card along the capture flap 45 and through the exit aperture.

In further embodiments a plurality of cassettes may be provided each having a respective card feed mechanism and communication module. Cards may be dispensed from any of the read positions for said communication modules towards a common capture flap, which is movable between a first orientation and a second orientation as before. The capacity of the card dispenser for storing cards may hence be increased and a level of redundancy may be provided to ensure continued operation in the event of a mechanical failure.

Figure 10:
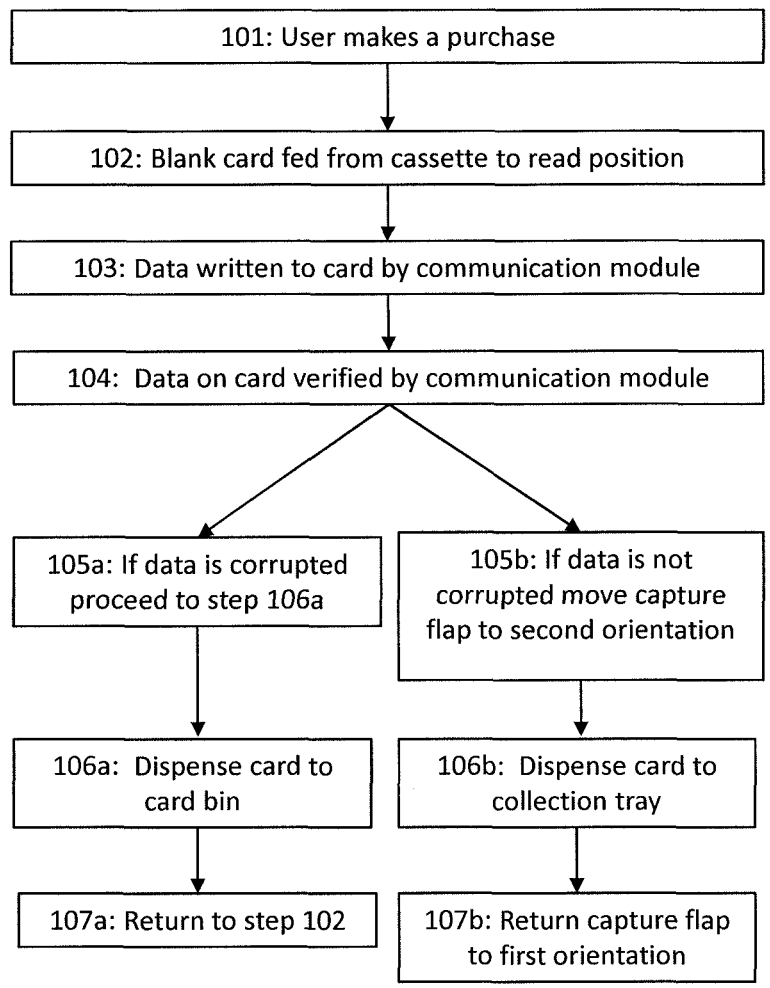
FIG. 10 is a flow chart illustrating a method for operating a card dispenser in accordance with the first embodiment.

A flow diagram illustrating a method for operating the card dispenser 10 is shown by FIG. 10 and will be discussed with reference to the illustrations in FIGS. 2-6. The method commences with the capture flap 5 arranged at the first orientation. At step 101 a user purchases a ticket from a ticket vending machine into which the dispenser 10 is incorporated. A 'blank' contactless card 1 containing no stored data is subsequently fed in a first direction from the cassette 12 to the read position. At the read position (shown by FIG. 2) the secure element of the card 1 is within range of the communication module 3 for communication to occur.

At step 102, data is written onto the card 1 by the communication module 3 in accordance with a purchase made by the user. This data transfer is achieved through an electromagnetic interaction between an antenna within the communication module 3 and the secure element. Once the data has been encoded onto the card 1, this data is then verified by the communication module 3 at the step 104. This process involves reading the data that is written onto the card 1 and comparing it against the source data which the communication module 3 attempted to write to the card 1.

Figure 3:
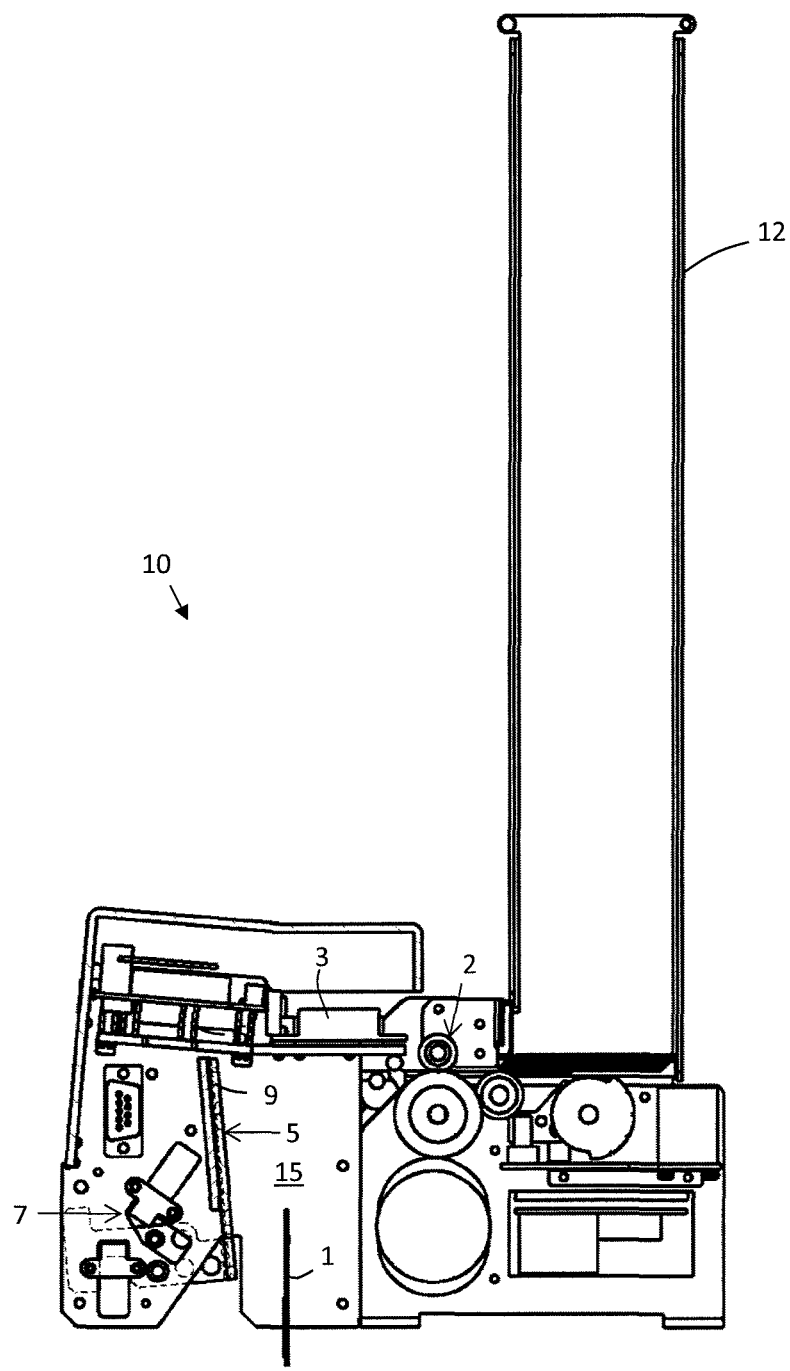

If the result of the verification process of step 104 indicates that the data encoded onto the card 1 contains errors and does not match the source data, the communication module 3 outputs an electrical signal in the form of a first output to the control system 4 indicating that the data is corrupted. This is step 105a. In practice this output may be returned from the communication module 3 in response to a command issued by the control system 4 to the communication module 3 enquiring as to the result of the verification process. In some embodiments the first output may simply be the absence of a second output. The method then proceeds to step 106a, which is illustrated in FIG. 3.

At step 106a the control system 4 issues a command to the card feed mechanism 2 causing it to move the card 1 in the first direction from the read position until it is dispensed into the capture chamber 15. The card 1 will then free-fall through the capture chamber 15 substantially unobstructed into the card bin 14 beneath. The card 1 may strike the second surface 9 of the floor member on its descent through the capture chamber 15. At the first orientation the capture flap 5 may hence guide the card 1 to the card bin 14. At step 107a the method returns to step 102 and the process repeats until the verification process is successful and a card 1 is dispensed to a user.

Figure 4:
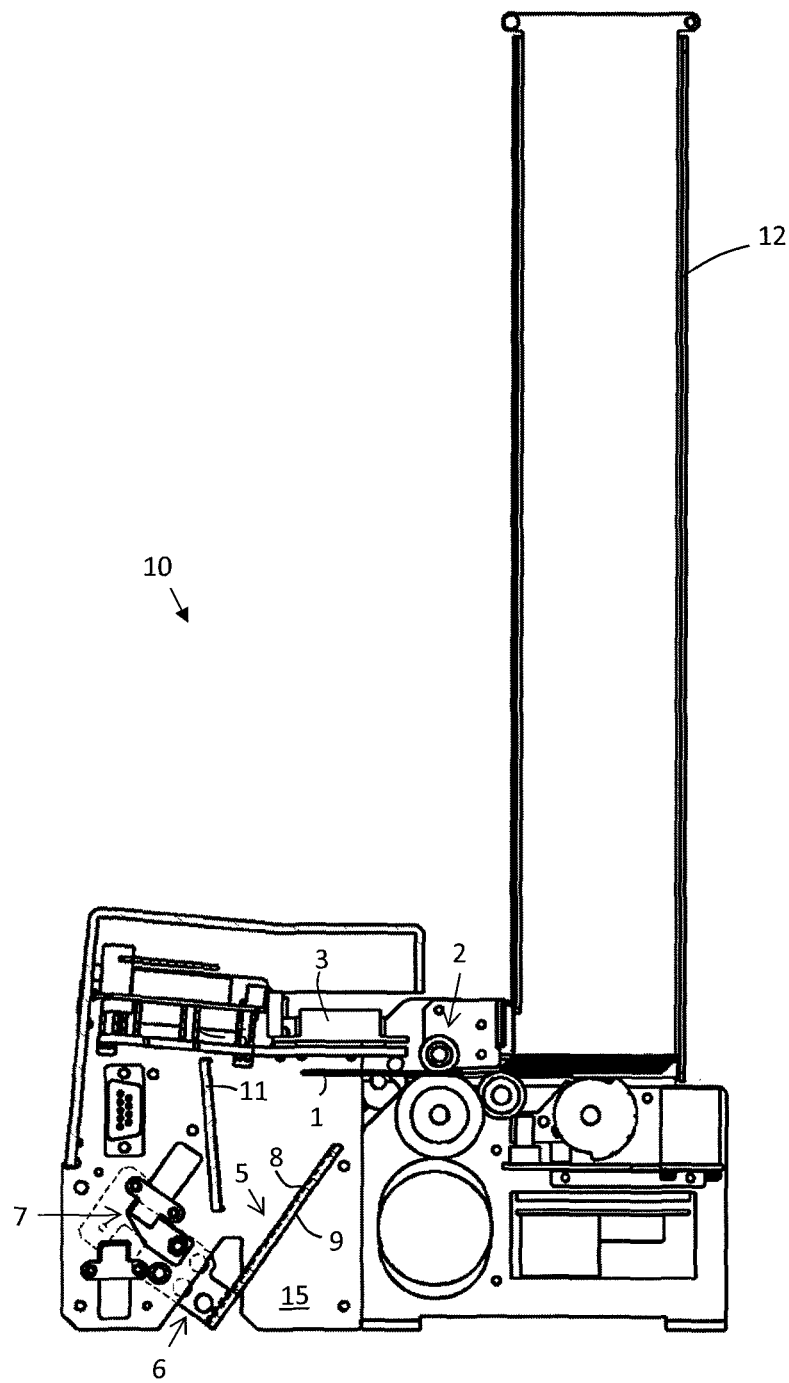

If the result of step 104 is that the data encoded onto the card 1 contains no errors (and therefore matches the source data), the communication module 3 issues an electrical signal to the control system 4 in the form of a second output. This is step 105b. The method then proceeds to step 106b, which is illustrated in FIG. 4.

At step 106b the control system 4 energises the solenoid 7 causing it to move an actuating member of the solenoid 7 against a compression spring. This movement causes a rotational movement of the capture flap 5 about the pivot 13 thereby moving the capture flap 5 to the second orientation. The capture flap 5 is held at the second orientation by the solenoid 7 provided the solenoid 7 remains energised. An exit aperture 6 of the card dispenser 10 is opened when the capture flap 5 is arranged at the second orientation, allowing cards to exit the card dispenser 10 from the capture chamber 15.

Figure 5:
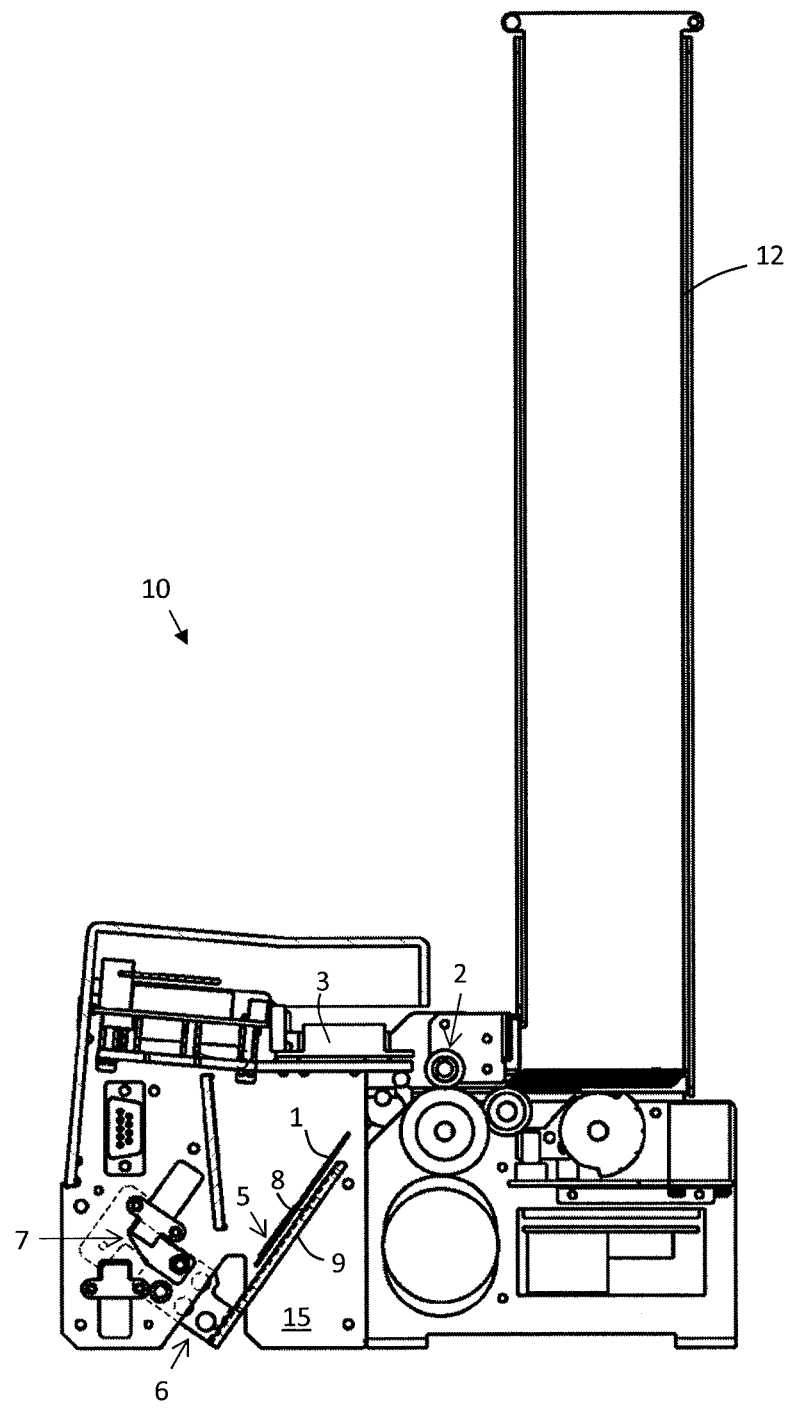
Figure 6:
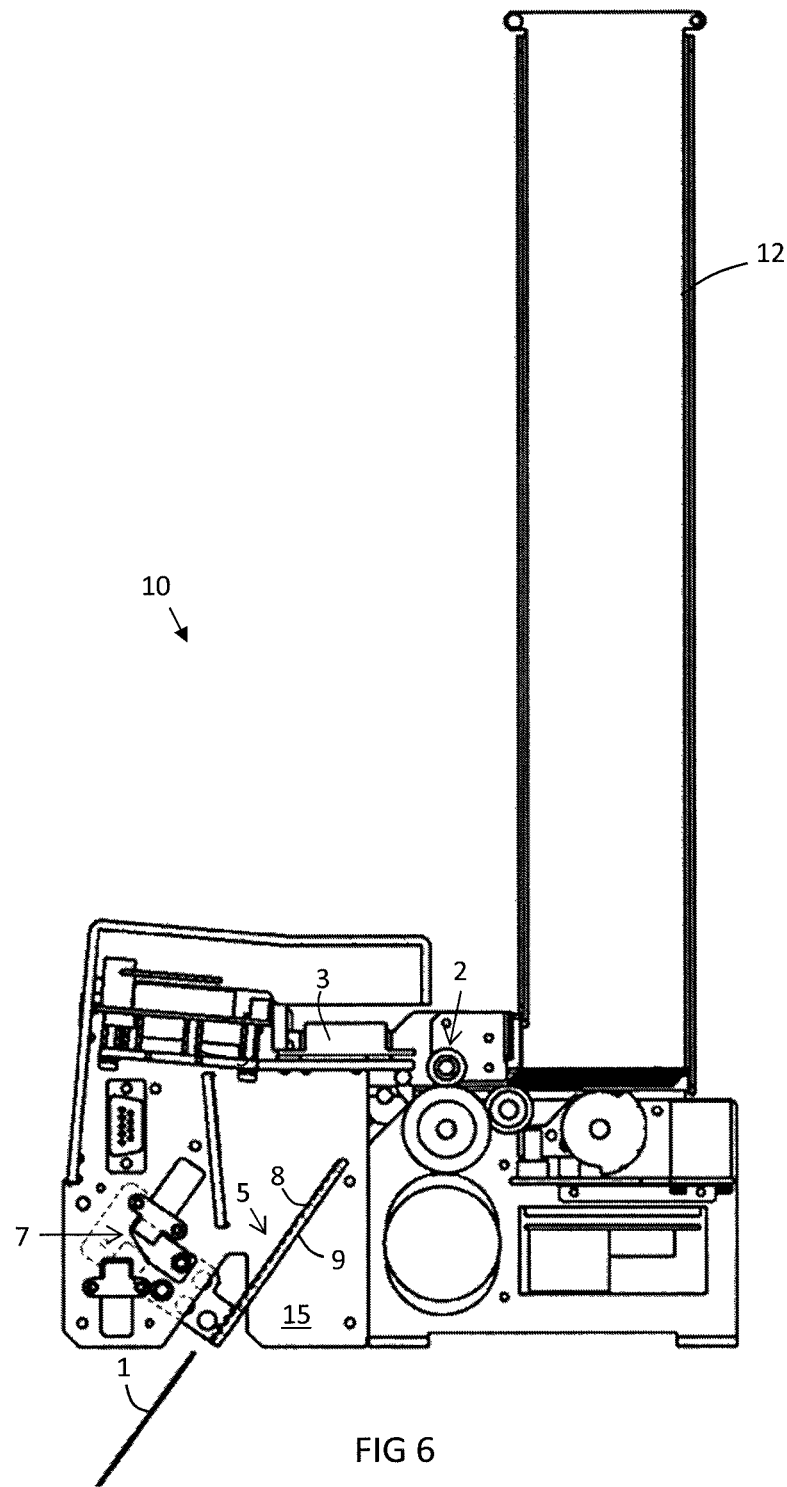

The method then proceeds to step 106b wherein the control system 4 issues a command to the card feed mechanism 2 causing it to move the card 1 in the first direction from the read position until it is dispensed into the capture chamber 15. The card 1 will then briefly free-fall through the capture chamber 15 until it is received by the capture flap 5, where it will slide along the first surface 8 of the floor member under gravity. This is shown by FIG. 5. An entire planar surface (i.e. the base) of the card 1 is brought into contact with the first surface 8 during this sliding motion. The card 1 will then continue to slide unobstructed along the floor member 5 and through the exit aperture 6, as shown by FIG. 6. The card 1 is then captured by the collection tray 16 arranged beneath the exit aperture 6 for collection by a device user. The capture flap 5 will hence guide the card 1 to the exit aperture (and the collection tray 16) when the capture flap 5 is arranged at the second orientation.

The method will then proceed to step 107b at which point the control system 4 de-energises the solenoid 7. The biasing force of the compression spring will then act against the actuating member causing it to retract and, in doing so, rotate the capture flap 5 back to the first orientation. The stopping member 11 is optionally provided to connect with the first surface 8 of the floor member so as to prevent rotation of the capture flap 5 from the second orientation to a position beyond the first orientation. The stopping member 11 may hold the capture flap 5 at the first orientation when the solenoid 7 is idle (i.e. not energised).

In an alternative example the card which is dispatched at step 102 may comprise pre-encoded data and the communication module 3 may be configured to read said data at step 103 and not write any new data onto the card. In this case the verification step 104 may comprise checking the pre-encoded data to see whether it has been corrupted, e.g. if it is readable, or whether the data on the card matches source data retrieved from memory.

Once the card 1 has passed through the bin aperture or the exit aperture 6, it is typically no longer under the direct control of any moving elements within the dispenser. Furthermore, movement of the card from the read position towards either of said locations may occur entirely or primarily under the influence of gravity and without the need for moving belts or rollers that are subject to mechanical failure.

As will be appreciated a card dispenser is disclosed herein that is more reliable than the prior art. For example, the dispenser is less likely to dispense a blank or data corrupted card to a user due to a mechanical fault. Advantageously the capture flap performs a dual function of guiding a card to either of two locations in a space saving manner, and closing the exit aperture of the dispenser so as to prevent the dispenser from being tampered with.

The invention claimed is:

1. A card dispenser comprising:
  a card store configured to hold a stack of cards;
  a card feed mechanism configured to move a card in a first direction from the card store to a read position and to dispense said card from the read position by further movement of the card in the first direction;
  a communication module arranged to communicate with a card provided at the read position;
  a capture chamber configured to receive a card dispensed from the read position by the card feed mechanism, the capture chamber comprising walls defining an exit aperture for dispensing a card to a user;
  a capture flap provided within the capture chamber, wherein said capture flap is moveable from a first orientation to a second orientation, said capture flap biased towards the first orientation wherein in the first orientation the capture flap provides a path from the read position to the card bin and fully closes the exit aperture, and wherein movement of the capture flap from the first orientation to the second orientation opens the exit aperture and closes the path to the card bin, and wherein in the second orientation the capture flap is arranged to guide a card through said exit aperture;
  a card bin configured to receive a card from the capture chamber when the capture flap is arranged at the first orientation; and a control system for controlling movement of the capture flap in accordance with an output received from the communication module such that:
  if a first output is received, the capture flap is held at the first orientation such that a card dispensed from the read position moves under the influence of gravity through the capture chamber into the card bin, and if a second output is received, the capture flap is moved from the first orientation to the second orientation such that a card dispensed from the read position slides along the capture flap under the influence of gravity through the exit aperture.

2. A card dispenser according to claim 1, wherein said capture flap comprises a first surface and a second surface, wherein the second surface is provided opposite to the first surface;
  wherein in the first orientation, the second surface blocks movement of a card from the capture chamber through the exit aperture, and in the second orientation, the capture flap is arranged such that a card may slide along the first surface through the exit aperture.

3. A card dispenser according to claim 1, wherein said capture flap comprises a floor member along which the card may slide when the capture flap is orientated at the second orientation.

4. A card dispenser according to claim 3, wherein said floor member makes a first non-zero angle with the horizontal when the capture flap is at the first orientation, wherein said first angle is preferably between 60 and 120 degrees, more preferably between 70 and 110 degrees, preferably still between 80 and 100 degrees.

5. A card dispenser according to claim 3, wherein the floor member comprises castellated features protruding from a lowermost end of the floor member, and wherein the capture chamber further comprises blocking members, wherein the blocking members are configured to engage with the castellated features in an interleaved manner, wherein the blocking members are arranged to extend along the same plane as the floor member when the capture flap is positioned at the second orientation.

6. A card dispenser according to claim 1, wherein said capture flap moveable between the first and second orientations about a pivot provided adjacent to the exit aperture.

7. A card dispenser according to claim 1, wherein the control system is configured to control the card feed mechanism so as to dispense a card from the read position if the first or second output is received from the communication module.

8. A card dispenser according to claim 1, wherein the card feed mechanism is configured feed a substantially rectangular card having two opposing short edges and two opposing long edges, the card feed mechanism configured such that the short edges of the card are arranged parallel to the first direction when the card is fed from the card store to the read position.

9. A card dispenser according to claim 1, wherein the communication module is adapted for contactless communication with a card provided at the read position.

10. A card dispenser according to claim 1, wherein said communication module is configured to encode data onto a card provided at the read position.

11. A card dispenser according to claim 1, wherein said communication module is configured to read data encoded onto a card provided at the read position.

12. A card dispenser according to claim 1, wherein the first output indicates that data stored on the card has not been correctly encoded to the card.

13. A card dispenser according to claim 1, wherein the second output indicates that data stored on the card has been correctly encoded onto the card.

14. A card dispenser according to claim 1, further comprising a collection tray arranged to receive a card from the exit aperture.

15. A card dispenser according to claim 1, wherein the card bin is arranged so as to not be accessible by a user during operation of the card dispenser.

16. A card dispenser according to claim 1, wherein the card store is a cassette.

* * * * *